Patented Nov. 4, 1952

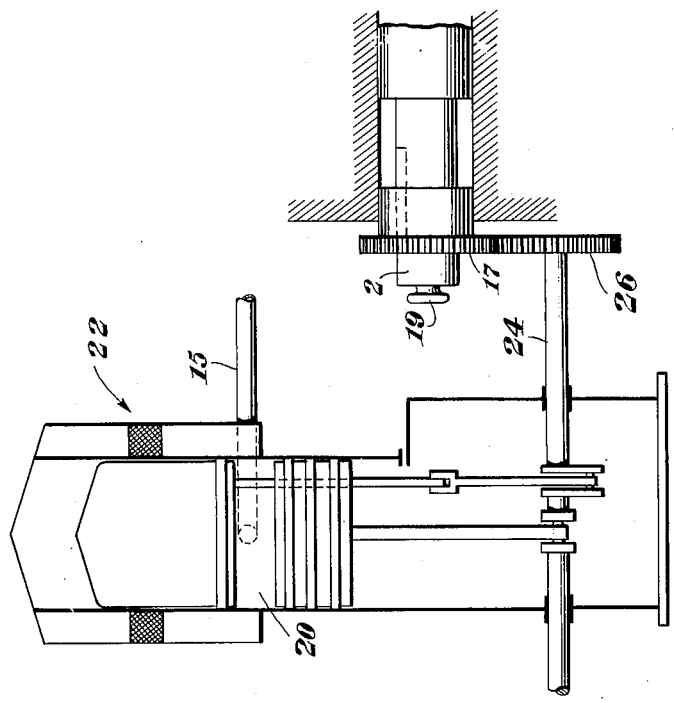
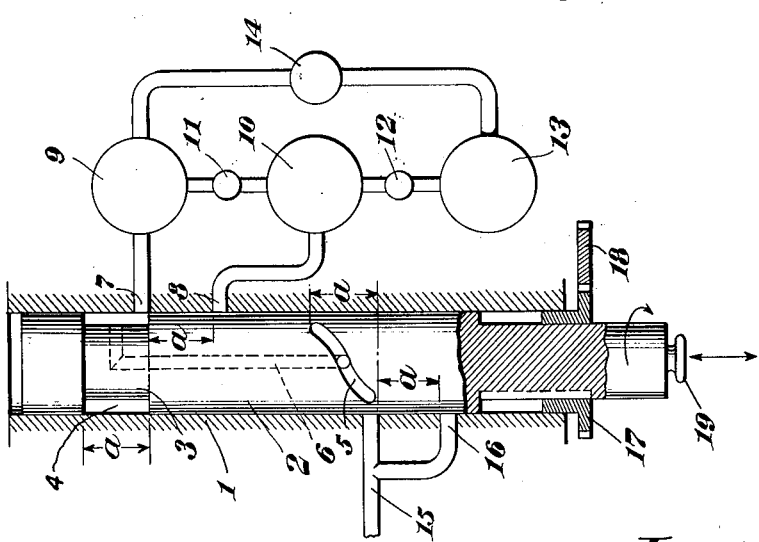

2,616,243

UNITED STATES PATENT OFFICE 2,616,243

REGULATING DEVICE FOR VARYING THE AMOUNT OF WORKING MEDIUM IN HOT-GAS ENGINES

Franciscus Lambertus Van Weenen, Eindhoven, Netherlands, assignor to Hartford National Bank and Trust Company, Hartford, Conn., as trustee Application April 23, 1949, Serial No. 89,270
In the Netherlands May 11, 1948

6 Claims. (Cl. 60—24)

1

This invention relates to hot-gas reciprocating engines (which term is to be understood to include refrigerating apparatus operating according to the reversed hot-gas engine principle) comprising a device for varying the amount of working medium participating in the cycle.

According to the invention, a hot-gas reciprocating engine comprising a device for varying the amount of working medium participating in the cycle is characterized in that this device comprises at least two regulating vessels of relatively different, substantially constant pressures and a regulating member by which the said regulating vessels may be connected to the working space in which the cycle is performed, the regulating member being capable also of varying the moments of the cycle at which a regulating vessel is connected to the working space.

The aforementioned device affords the advantage of rapid regulation with a great regulating range.

A simple construction is obtained if by means of a regulating member having a slide rotatable about its longitudinal axis and exhibiting at least one channel, the working space may be connected to at least two regulating vessels by axial displacement of the regulating member, it being also possible, likewise by axial displacement of the regulating member, to vary the moment at which the communication between the working space and a regulating vessel is established.

This displacement of the slide in the direction of its longitudinal axis permits of providing over a range of power continuous power regulation. Furthermore, this displacement may be performed in a simple manner by means of a regulator.

To ensure exact regulation, it is of importance that the regulating vessels should be maintained as far as possible at constant pressures. This may be achieved in a simple manner if the regulating vessels communicate with at least one regulating vessel of lower pressure or with a space of still lower pressure by means of a device for reducing pressure.

If gases other than air are used as the working medium, it may be important to utilise a closed regulating system. A closed regulating system may be obtained if the regulating vessel of the lower pressure, which may be caused to communicate with the working medium participating in the cycle, communicates with the space of still lower pressure by means of a reducing device, in which event provision is made of means for causing gas to flow from this space

2 of still lower pressure into the regulating vessel of the higher pressure.

In this arrangement the pressure in the vessel of the lower pressure also remains constant. In the case of an open regulating system the atmospheric pressure may be used as the still lower pressure.

The invention will now be explained more fully by reference to the accompanying drawing showing diagrammatically by way of example, in which:

Figure 1 shows an embodiment of the regulating device according to the invention, and Figure 2 shows a conventional hot-gas engine connected to the regulating device of Figure 1.

A slide 2 within a housing 1 is rotatable as well as slidable in the direction of its longitudinal axis. The slide 2 comprises a re-entrant portion 3, thus resulting in an annular space 4 having a height $a$. The slide furthermore comprises a helical channel 5, likewise of a height $a$, and a bore 6 through which the annular space 4 communicates with the helical channel 5.

The housing 1 exhibits two channels 7 and 8, which communicate with regulating vessels 9 and 10 respectively. The distance between the channels 7 and 8 preferably is equal to the height $a$ of the space 4. A regulating vessel 9 of the higher pressure communicates, by means of a reducing device 11, for example a reducing valve, with a regulating vessel 10 of lower pressure, and the latter by means of a reducing device 12 with an auxiliary space 13, which space communicates by way of a compressor 14 with the regulating vessel of the highest pressure.

Within the housing 1 are two further channels 15 and 16, which are spaced apart by a distance $a$ and which jointly communicate with a working space 20 of the engine 22 (as shown in Fig. 2).

At the position of the slide 2 at which the channel 7 is open, the helical channel 5, communicates with the channel 15.

The slide 2 is caused to rotate at a speed equal to that of the crankshaft 24 of the engine by means of gear wheels 17, 18 and 26. The slide 2 is slidable in its longitudinal direction in the gear wheel 17, the gear wheel 17 transmitting its rotary motion to the slide with the use of a wedge. The slide is adapted to be shifted in its longitudinal direction either manually as at 19 or by means of a regulator.

The operation of the device is as follows:

In the position shown, the regulating vessel 9 of the higher pressure communicates with the working space of the engine by way of the channel 7, the annular space 4, the channel 6, the helical channel 5 and the channel 15.

Since the slide 2 rotates at a speed equal to that of the crankshaft of the engine, the connection of the regulating vessel 9 with the working space of the engine is established once during each revolution, in the case under consideration for example, when the cycle during each revolution has attained its lowest pressure. The power thus supplied by the engine is increased to a maximum.

If now it is desired to reduce the power of the engine the slide requires to be moved slightly downwards, so that communication with the regulating vessel of the higher pressure is established at a moment of the cycle other than and slightly different from the moment at which the pressure is lowest, as a result of which the maximum pressure is lower and the average pressure of the cycle decreases. Further displacement results in further reduction in power, since the moment at which the communication is established is varied by a greater amount and the maximum pressure decreases.

When the slide has been displaced over a distance $a$, further displacement results in the regulating vessel 10 of lower pressure communicating with the working space of the engine through the helical channel 5 and the channel 16. As before, the moment at which the regulating vessel 10 communicates with the working space is such that the engine has its maximum power at the pressure of this regulating vessel, which power is smaller than the smallest power that can be supplied with the periodic connection of the regulating vessel of higher pressure. Further displacement results in the moment at which the working space is caused to communicate with the regulating vessel being varied in such manner that the power of the engine is still smaller. If the engine is required to supply a greater power, the slide must now be moved in the opposite sense.

In order to maintain a constant pressure in the regulating vessels, the vessel 9 of the higher pressure communicates by means of a reducing device 11 with the vessel of lower pressure 10. In regulating from a great power to a small power, the pressure of the working medium in the engine may exceed the pressure of the regulating vessel with which it is caused to communicate, which will result in medium flowing from the working space to the regulating vessel. This may in time lead to an inadmissible increase in pressure in the last-mentioned regulating vessel, so that the regulation would be disturbed. The regulating vessel 10 of the lower pressure therefore communicates through a reducing device 12 with an auxiliary space 13 so that the pressure remains constant in the regulating vessel of the lower pressure. When use is made of an open regulating system, the space 13 may be at atmospheric pressure. If a gas other than air is used as the working medium, it is preferable to utilise a closed regulating system, in which event gas is caused to flow by use of the compressor 14 from the auxiliary space 13 into the regulating vessel 9 of higher pressure.

It will be evident that the hot-gas engine according to the invention may be constructed in various other ways. It is possible, for example, to provide the helical channel 5 as well as the cylindrical space 4 in the wall of the housing 1. It is furthermore possible that a plurality of pressure vessels of different pressures intermediate the lower and higher pressures are provided, which vessels may be arranged in series and in parallel between the vessel of the higher pressure and the vessel of lower pressure.

What I claim is:

1. A regulating device for varying the amount of working medium in the cycle of a hot-gas reciprocating engine, said regulating device comprising a first vessel at a high constant pressure, a second vessel at a low constant pressure, regulating means for selectively connecting either vessel to the working space of said hot-gas reciprocating engine at a predetermined moment of the cycle.

2. A regulating device for varying the amount of working medium in the cycle of a hot-gas reciprocating engine, said regulating device comprising a first vessel at a high constant pressure, a second vessel at a low constant pressure, regulating means comprising a housing, a sliding member therein, gear means driven by said engine to rotate said member, channel means in said member to connect either said first or second vessel to the working space of said hot-gas engine and means to axially displace said member to vary the time in the cycle when said connection is made.

3. A regulating device for varying the amount of working medium in the cycle of a hot-gas reciprocating engine, said regulating device comprising a first vessel at a high constant pressure, a second vessel at a low constant pressure, regulating means for selectively connecting either vessel to the working space of said hot-gas reciprocating engine, said regulating means comprising a housing, a sliding member therein, means to rotate said member on its longitudinal axis, first means connecting each of said vessels to said housing, second means for connecting said working space to said housing, channel means in said member for establishing communication between said first and second means and means to axially displace said member to vary the moment in the cycle at which said communication is established.

4. A regulating device for varying the amount of working medium in the cycle of a hot-gas reciprocating engine, said regulating device comprising a first vessel at a high constant pressure, a second vessel at a low constant pressure, a regulator comprising a housing, a sliding member therein, means to rotate said sliding member on its longitudinal axis, first conduit means connecting the working space in said hot-gas engine to said housing, second conduit means for connecting said first vessel to said housing, third conduit means for connecting said second vessel to said housing, channel means in said member for establishing communication with either said first and second conduit means or said first and third conduit means, and means to axially displace said member to vary the moment in the cycle at which said communication is established.

5. A regulating device for varying the amount of working medium in the cycle of a hot-gas reciprocating engine, said regulating device comprising a first vessel at a high constant pressure, a second vessel at a low constant pressure, regulating means for selectively connecting either vessel to the working space of said hot-gas reciprocating engine, said regulating means comprising a housing, a sliding member therein, gear means driven from said engine to rotate said member on its longitudinal axis, first means connecting each of said vessels to said housing, second means for connecting said working space to said housing, channel means in said member for establishing communication between said first and second means, means to axially displace said member to vary the moment in the cycle at which said communication is established, said first vessel communicating through a first device for reducing pressure with said second vessel and said second vessel communicating through a second device for reducing pressure to a third vessel of still lower pressure.

6. A regulating device for varying the amount of working medium in the cycle of a hot-gas reciprocating engine, said regulating device comprising a first vessel at a high constant pressure, a second vessel at a low constant pressure, regulating means for selectively connecting either vessel to the working space of said hot-gas reciprocating engine, said regulating means comprising a housing, a sliding member therein, means to rotate said member on its longitudinal axis, first means connecting each of said vessels to said housing, second means for connecting said working space to said housing, channel means in said member for establishing communication between said first and second means, means to axially displace said member to vary the moment in the cycle at which said communication is established, said first vessel communicating through a first device for reducing pressure with said second vessel, said second vessel communicating through a second device for reducing pressure with a third vessel of still lower pressure and pump means for causing gas to flow from said third vessel into said first vessel.

FRANCISCUS LAMBERTUS VAN WEENEN.

REFERENCES CITED

The following references are of record in the file of this patent:

UNITED STATES PATENTS

| Number | Name | Date |
|---|---|---|
| 826,313 | Clark | July 17, 1906 |
| 2,345,950 | Salzmann | Apr. 4, 1944 |

FOREIGN PATENTS

| Number | Country | Date |
|---|---|---|
| 579,954 | Great Britain | Aug. 21, 1946 |